Inventors.
Hubert Abermeth
Peter Combüchen

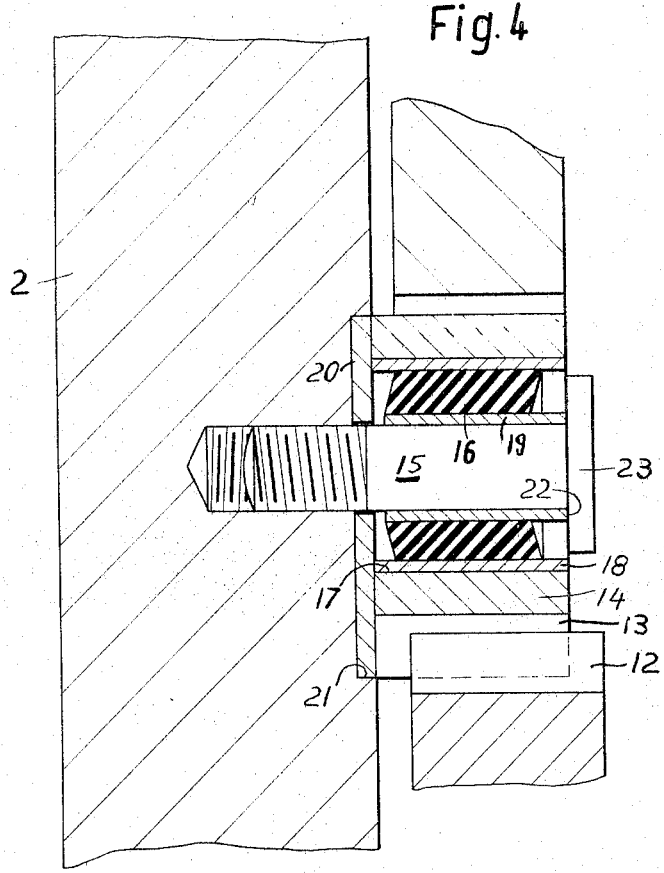

United States Patent Office 3,295,754
Patented Jan. 3, 1967

3,295,754
ROTARY PISTON MACHINE, PARTICULARLY ROTARY PISTON INTERNAL COMBUSTION ENGINE
Hubert Abermeth, Cologne, and Peter Combuchen, Bergisch-Gladbach, Germany, assignors to Klöckner-Humboldt-Deutz Aktiengesellschaft, Cologne, Germany
Filed Jan. 17, 1966, Ser. No. 520,965
Claims priority, application Germany, Apr. 2, 1962, K 46,349
4 Claims. (Cl. 230—145)

This is a continuation-in-part application of our copending patent application Serial No. 269,483, filed April 1, 1963, now abandoned and entitled "Rotary Piston Machine, Particularly Rotary Piston Internal Combustion Engine."

The present invention relates to a rotary piston machine, especially rotary piston internal combustion engine, in which the kinematic control of the piston relative to the outer or enveloping body of the machine is effected by gears one of which is designed as stationary gear with inner or outer teeth and connected to one of the side walls of the outer or enveloping body.

After numerous attempts over a period of years it has only recently been possible to drive a so-called circular piston internal combustion engine as gasoline engine. This circular piston internal combustion engine operates with outer mixture formation through the intervention of a carburator for gasifying the fuel.

With heretofore known circular piston internal combustion engines, the inner confining surface of the enveloping body is designed in conformity with the contour of an epitrochoid with two axis-near zones. The rotary piston within said enveloping body has its outer circumference, in conformity with said epitrochoid, provided with three ridges by means of which in cooperation with the inner confining surface of the outer body and the side walls of the latter the working chambers of the machine are sealed with regard to each other. The kinematic control of the piston relative to the enveloping body is effected by gears one of which is designed as stationary gear with inner or outer teeth and connected to one of the side walls of the machine.

The known circular piston internal combustion engines, in view of the particular design of the outer body and of the piston, have the great advantage that the gears for effecting the kinematic control of the piston relative to the outer or enveloping body are normally not under load. This is due to the fact that the piston working surface facing the combustion chamber is located, in the manner of a scale beam, above the eccentric shaft about which the piston is rotated. Only a minor load acts upon the gears during a sudden and fast acceleration or retardation in the movement of the piston.

However, other circumstances may occur which bring about a considerable load on the gears kinematically controlling the piston relative to the outer or enveloping body. Among such circumstances there may be mentioned, for instance, the opening of the exhaust gas outlet within the inner confining surface of the enveloping body by that front piston ridge (when looking in the direction of rotation of the piston) which is adjacent the combustion chamber, and the nonuniform pressure relief of the piston inherent to the opening of the exhaust gas outlet. In such circumstances, a transitory strong return torque is exerted upon the piston, which torque is conveyed to the gears controlling the piston movement. Strong transitory torques in either direction upon the piston may also be caused by a nonuniform burning of the charge in the combustion chamber. Tests have proved that in this way, the load on the gears becomes so high that it is difficult to absorb these forces in the teeth of the gears.

In order to avoid overloading of the gears which may result in damage to or breaking of the meshing teeth of the gears, elastic means may be provided which will permit yielding of the gears within certain limits under overload. Preferably, these elastic means are in the form of elastic sleeves surrounding the bolts which connect one of the gears to one of the side walls of the outer body. However, there exists the danger that these elastic sleeves cause the gear to vibrate and oscillate which may, of course, seriously endanger the proper operation of the machine.

It is, therefore, an object of the present invention to provide a rotary piston machine, especially rotary piston internal combustion engine, which will overcome the above mentioned drawbacks.

It is another object of the present invention to provide a rotary piston machine with means which will dampen or completely eliminate vibrations and oscillations in the transmission gears of the machine.

It is a further object of the present invention to provide a machine as set forth in the preceding paragraphs with shock absorbing and damping means of particularly simple and space saving design, which is of particular importance in connection with rotary piston machines.

These and other objects and advantages of the invention will appear more clearly from the following specification in connection with the accompanying drawings, in which:

FIG. 4 illustrates on a scale larger than that of FIG. 1 the dot-dash encircled portion of FIG. 1.

The rotary piston machine according to the present invention, in which the kinematic control of the piston relative to the outer enveloping body is effected by gears one of which is designed as stationary gear with inner or outer teeth and connected to one of the side walls of the machine by bolts surrounded by elastic sleeves, is characterized primarily in that vibration or oscillation damping means is provided at said stationary gear, which is preferably in the form of a disc of high friction value interposed between the gear and said one side wall while said gear is pressed against said disc by axially preloading the elastic sleeves by said connecting bolts.

Figure 1:
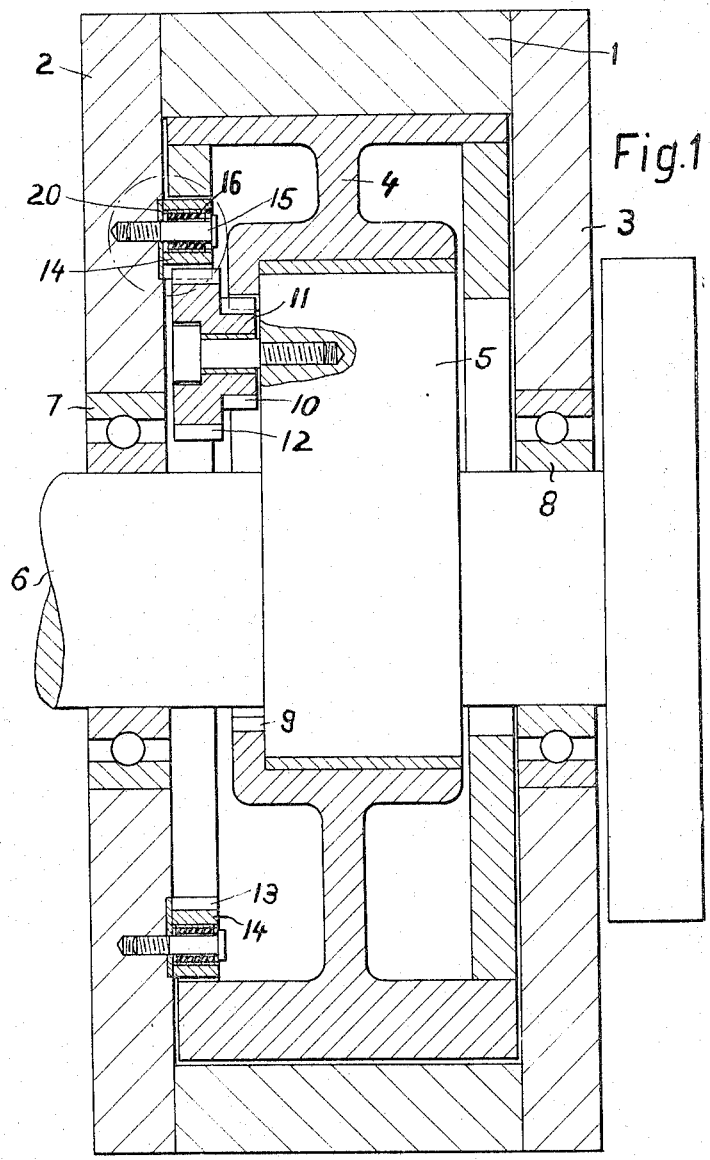
FIG. 1 is a section through a circular piston internal combustion engine equipped with a gear transmission designed in conformity with the present invention.
Figure 2:
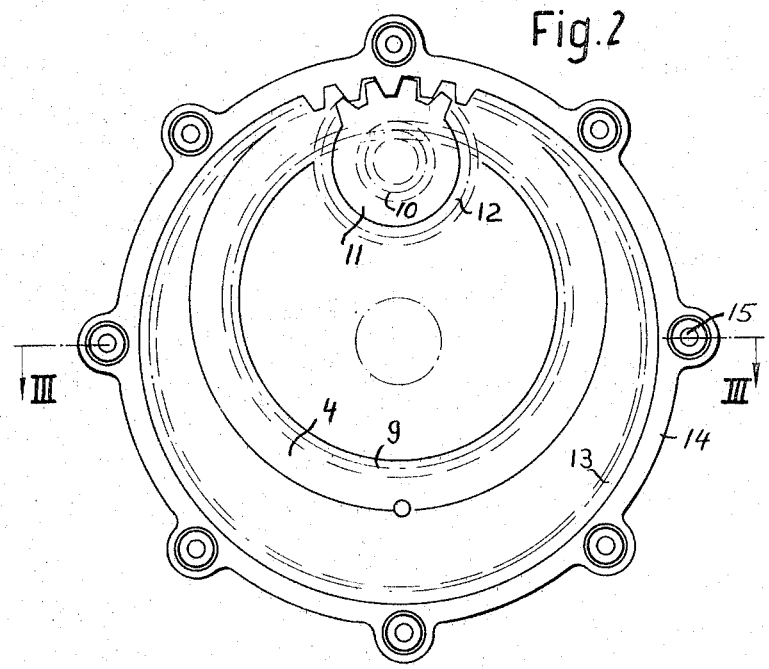
FIG. 2 is a side view of the gear transmission according to FIG. 1.
Figure 3:
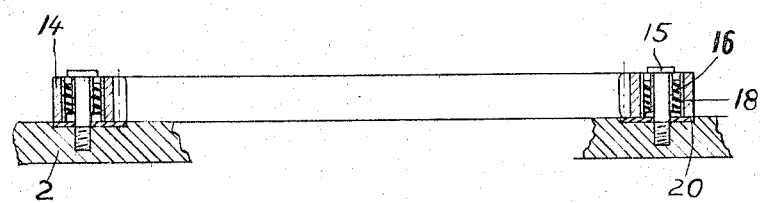
FIG. 3 shows a section of the gear transmission of FIG. 2, said section being taken along the line III—III of FIG. 2.

Referring now to the drawings in detail and FIG. 1 thereof in particular, the circular piston machine shown therein comprises an outer or enveloping body 1 with side walls 2 and 3 and also comprises a piston 4 rotatably mounted on an eccentric 5 of an eccentric shaft 6. Shaft 6 is rotatably journalled in bearings 7 and 8 in side walls 2, 3. Piston 4 is provided with inner teeth 9 meshing with the teeth 10 of a double pinion 11 the other teeth 12 of which are in meshing engagement with the inner teeth 13 of a gear ring 14.

Gear ring 14 is connected to side wall 2 of the outer body by screw bolts 15 surrounded by elastic sleeves 16 made of rubber or elastomeric synthetic material. More specifically, with regard to FIG. 4, gear ring 14 has provided therein circumferentially spaced bores 17 in which are press fit metallic sleeves 18. Each sleeve 18 has vulcanized thereto the outer circumferential surface of an elastic sleeve 16 the inner circumferential surface of which is vulcanized to a further metallic sleeve 19 encasing screw bolt 15. Sleeve 19 is arranged on bolt 15 with sufficient play to permit axial and circumferential movement of bolt 15 relative to sleeve 19. Gear ring 14 and sleeve 18 frictionally engage a friction disc 20 which is inserted in a correspondingly shaped groove 21 of side wall 2.

Disc 20 is of the type employed in clutches or the like, i.e. has a high friction value and may for instance be made of asbestos compressed with synthetic resin, or of metal wool compressed with buna, or of leather. Gear ring 14 may be made of steel, steel alloy, tempered, hardened, or cast steel, while sleeves 18 and 19 may, for instance, consist of steel, copper, brass or other alloys.

Inner sleeve 19 rests with one end face 22 against the head 23 of screw bolt 15. Sleeve 19 is shorter than the outer sleeve 18 by a distance corresponding to the maximum desired axial preloading stroke of elastic sleeve 16 when tightening screw bolt 15. Thus, sleeve 19 will not engage friction disc 20 even if sleeve 16 is under maximum preload.

It will be appreciated that the preload of sleeve 16 may be adjusted by more or less tightening screw bolt 15 and that thereby the friction force between disc 20 and gear ring 14 may be varied, which has to be overcome in order to displace gear ring 14 in circumferential direction. The friction between gear ring 14 and disc 20 will prevent the gear ring from oscillating back and forth when the latter is subjected to a sudden shock-like overload.

It will be evident from the above that the elastic sleeves 16 will perform a double function. On one hand, they will permit a small yielding movement of the gear ring relative to the housing so as to absorb overload. On the other hand, they will press the gear ring against the friction disc to dampen the yielding movement of the gear ring and prevent vibrations and oscillations. It will furthermore be apparent that the shock and vibration or oscillation damping means according to the present invention are simple in design and space saving so that they can easily be accommodated in the narrow space available within a rotary piston machine.

It is, of course, to be understood that the present invention is, by no means, limited to the particular construction shown in the drawings but also comprises any modifications within the scope of the appended claims.

What we claim is:

1. A rotary piston machine, especially rotary piston internal combustion engine, which includes: an outer body with lateral confining wall means, a rotary piston eccentrically and rotatably arranged within said outer body, a gear ring having one of its end faces arranged adjacent one of said wall means, friction disc means interposed between said one wall means and said one end face of said gear ring, said gear ring being provided with circumferentially spaced bores having their axes substantially perpendicular to said one end face of said gear ring, elastic sleeve means respectively arranged in said bores and in firm connection with said gear ring, bolt means respectively extending through said sleeve means into and being connected to said one wall means so as to place said sleeve means under preload in axial direction thereof to firmly press said gear ring against said friction disc means, and gear means drivingly interconnecting said piston and said gear ring.

2. A rotary piston machine according to claim 1, which includes a plurality of bushings respectively press-fitted in said bores, each of said elastic sleeve means having its outer circumferential surface vulcanized to the respective bushing in the respective bore in which said sleeve means is located.

3. A rotary piston machine according to claim 1, which includes a plurality of bushing means respectively arranged within said bores and slidably engaging and surrounding said bolt means, each of said elastic sleeve means having its inner peripheral surface vulcanized to the respective bushing means in the respective bore in which said sleeve means is located, that inner end face of said bushing means which faces said one wall means being movable toward the latter by a distance at least equalling the maximum desired preloading stroke of said elastic sleeve means.

4. A rotary piston machine according to claim 3, in which each of said bolt means has a bolt head having a diameter less than the outer diameter of said elastic sleeve means but greater than the inner diameter of said bushing means for engagement with that end face of said bushing means which faces away from said one wall means.

References Cited by the Examiner

UNITED STATES PATENTS

| | | | |
|---|---|---|---|
| 1,649,739 | 11/1927 | Rosselle | 74—411 |
| 2,702,995 | 3/1955 | Biedess | 74—411 |
| 2,868,037 | 1/1959 | Hindmarch | 74—411 |
| 2,932,992 | 4/1960 | Larsh | 74—411 |
| 2,956,451 | 10/1960 | Bowman | 74—411 |
| 2,980,373 | 4/1961 | Pyles | 74—411 |
| 2,988,065 | 6/1961 | Wankel et al. | 123—8 |
| 3,077,867 | 2/1963 | Froede | 123—8 |
| 3,090,258 | 5/1963 | Zink et al. | 74—411 |

FOREIGN PATENTS

| | | |
|---|---|---|
| 991,383 | 6/1951 | France. |
| 559,602 | 3/1957 | Italy. |

MARK NEWMAN, *Primary Examiner.*

W. J. GOODLIN, *Assistant Examiner.*